United States Patent Office 3,594,283
Patented July 20, 1971

3,594,283
FERMENTATIVE PROCESS FOR THE PREPARATION OF TETRACYCLINE
Riccardo Barchielli, Graziana Canevazzi, Arpad Grein, and Romano Tintinelli, Milan, Italy, assignors to Società Farmaceutici Italia, Milan, Italy
No Drawing. Filed Aug. 21, 1967, Ser. No. 661,826
Claims priority, application Italy, Mar. 23, 1967, 14,040/67
Int. Cl. C12d 9/18
U.S. Cl. 195—80                                        2 Claims

ABSTRACT OF THE DISCLOSURE

Described is a fermentative process for the preparation of tetracycline. The process is characterized in that the new Sterptomyces avellaneus is cultivated under aerobic conditions in a nutritive medium containing a carbon and nitrogen source and mineral salts at a temperature of from 22° to 35° C. over a period of from 72 to 168 hours at a pH of from 6.0 to 7.2. The thus obtained tetracycline is separated from the fermentation broth and purified as such or transformed in known manner into its salts with non-toxic pharmaceutically acceptable inorganic or organic acids.

---

Our invention has as its object a fermentative process for the preparation of tetracycline.

The invention relates to a microbiological process for the preparation of tetracycline by the use of a new microorganism Streptomyces avellaneus also called Streptomyces F.I. 2758, which has been deposited at the Commonwealth Mycological Institute, Ferry Lane, Kew, Surrey (Great Britain) where it received the index number I.M.I. 126840, and at the Institute of Microbiology of Rutgers University (U.S.A.) where it received the index number 3911. The antibiotic tetracycline, the preparation thereof and its chemical, physical and biological properties are fully described in literature (Waksman S.A. "The Actinomycetes," vol. III, 1962, p. 389). We have found that by fermentation of the new microorganism Streptomyces F.I. 2758 high quantities of the antibiotic tetracycline are formed and that the presence of chlorine ions in the fermentative medium does not influence the process unfavorably.

The new microorganism producing tetracycline was isolated from a soil sample from Grotte di Caudano (Cuneo-Italy) and shows the following morphological, cultural and biochemical properties:

Morphological properties

On the usual culture media, the vegetative mycelium shows hyphae 0.9–1.1μ thick, more or less long and abundantly branched. From these, hyphae thicker than 1.2–1.5μ are formed which are not very long, are straight, generally collected in bunches, look like a fan, and sympodially branched. At a certain moment these condiophore hyphae change into conidia having a smooth surface, which look like a small cask or show a slightly cyindrical form with a diameter of 1.2–1.5 x 1.4–1.7μ. At first, these conidia are disposed in chains with from 5 to 15 per chain. They then separate.

Cultural and biochemical properties

In Table I are reported the cultural properties obtained on media by culturing the microorganism at 28° C. and carrying out observations at the 5th, 15th and 25th days after inoculation in test tubes and on petri plates.

The strain grows rather slowly on either synthetic or natural agar cultural media. On synthetic media, it forms a vegetative mycelium which always consists of a patina originating from the confluence of single colonies, not very raised and of a straw to yellow-orange-brown color. On organic media, a patina is formed originating from the confluence of fairly raised dome-shaped colonies whose color changes from yellow to rather chestnut-brown, sometimes with a red-brown tonality. The aerial mycelium on synthetic media is generally scarce or even absent. The aspect is smooth and the color varies from white to beige with slight chestnut-brown tonality. On organic media generally, the aerial mycelium grows rather abundantly with a smooth aspect and is from light chestnut-brown to strong chestnut.

Streptomyces F.I. 2758 does not develop on milk but remains unaltered. It does not hydrolyze gelatin, does not reduce nitrates to nitrites, does not produce hydrogen sulphide, does not utilize tyrosine or even melanine. It hydrolyzes starch abundantly. It utilizes glucose, saccharose and maltose for growth but not l-arabinose, d-xylose, mesoinositol, d-mannose, d-fructose, ramnose or raffinose. The strain does not produce soluble pigments, does not produce sclerotia in solid cultures and does not grow at 50° C. In aerated liquid culture, it produces the antibiotic tetracycline.

TABLE I.—CULTURAL PROPERTIES OF STREPTOMYCES F.I. 2758

| Media | Growth | Aerial mycelium | Vegetative mycelium |
|---|---|---|---|
| Bennet's agar [1] | Fair: little confluent colonies in slight relieved patina. | Fair: growth in short and scanty patina, of light chamois color. | From yellow-lemon to light chesnut color; analogous back side only more attenuated color. |
| Czapeck's agar | Little confluent colonies in sparse patina, nearly transparent. | Absent | Colorless with a back side almost straw-colored. |
| Asparagine glucose agar [1] | Fair: little confluent colonies in patina slightly relieved. | Absent | From straw to light chestnut color with analogous color to back side. |
| Glycerol-glycin agar [1] | Sparse: confluent colonies in patina slightly relieved. | Scanty, in short and scanty patina, slightly powdery of white color with a slight chamois-brown tonality. | From colorless to chestnut straw color to light chestnut-brown color with straw-colored back side. |
| Emerson's agar [1] | Fair: little confluent colonies in folded patina. | Absent | From orange to chestnut-brown with slight reddish tonalities. |
| Starch and salts agar [2] | Fair: little confluent colonies in smooth patina. | Fair: in short and scanty powdery patina of white to chamois-brown color with light rose vine tonalities. | From straw to light chestnut-brown color with back side of straw color. |
| Agar potato [4] | Fair: little confluent colonies in slight folded patina. | Scanty, in short and scanty patina, powdery, of white color with chamois brown tonalities. | From orange straw to light chestnut brown color with more attenuated analogous back side color. |
| Oats agar [3] | Fair: little confluent colonies in smooth patina. | Fair from white brown to light chamois. | From straw to light chestnut-brown color analogous back side color. |
| Glycerol-asparagine-agar [1] | Scanty: little confluent colories in smooth patina. | Scanty, white with chamois-brown tonalities to short and scanty growth. | From straw color with slight greenish tonalities: orange and light brown chestnut-brown color. |
| Yeast-glucose extract agar [1] | Fair: little confluent colonies in slight folded patina. | Absent | From yellow-orange to chestnut-chestnut-brown color. |

[1] Waksman S.A.: "The Actinomycetes" vol. II; The Williams and Wilkens Company, 1961; p. 328–334.
[2] Pridham T.G., Anderson P., Foley C., Lindenfelser L.A., Hesseltine C.M., and Benedict R.B.: "Antibiotic Annual 1956–1957", p. 947–953.
[3] Baldacci E., Giolitti G., Küster E., and Scotti T.: Journal of Microbiology, vol. 2, p. 39, 1961.
[4] 200 g. of boiled potatoes are filtered through a gauze and 20 g. of glucose and 20 g. of agar are added. The resultant liquid is taken up to a volume of 1 liter and is sterilized at 120° C for 20 minutes.

Identification of the strain

The properties shown by the microorganism under examination and previously described allow it to be related to the genus Streptomyces Waksman et Henrici (Bergey's Manual of Determinative Bacteriology, 7th ed., 1957, p. 744–745). Streptomyces F.I. 2758 belongs to the "Rectus flexibilis" section of Pridham et al. (Appl. Microbiol., 1958, vol. 6, p. 52), because it forms straight sporophores. This section is divided in six "series" characterized by the color of the aerial mycelium: white, olive-buff, yellow, blue, red gray. Streptomyces F.I. 2758 shows aerial mycelium of typically hazel-brown color and so cannot belong to any of these series, or to any related species.

Streptomyces F.I. 2758 also belongs to section II of Baldacci: "Vegetative colored mycelia; development on agar generally abundant, substantial (creamy, with pellets etc.); retarded and sometimes partially sporification" (Journal of Microbiology 1958, vol. 6, p. 10). This section is divided into "series" characterized by different combinations of colors of the vegetative and aerial mycelium. No one of these combinations corresponds to that of Streptomyces F.I. 2758 which is characterized by an orange-brown vegetative mycelium and hazel-brown aerial mycelium.

Furthermore, Streptomyces F.I. 2758 belongs to the melanine-negative series of Waksman (The Actinomycetes, vol. II, 1961, p. 117). The series of this group are characterized by different combinations of the following properties: color of the aerial mycelium, color of the vegetative mycelium and formation of spirals. No one of these combinations coincides with that of Streptomyces F.I. 2758 which has hazel-brown aerial mycelium, orange-brown vegetative mycelium and absence of spirals.

Table II compares the properties of Streptomyces F.I. 2758 with those of other streptomycetes producing tetracycline. From this comparison it is evident that Streptomyces F.I. 2758 is not identifiable with any one of those microorganisms and so should be considered as belonging to a different species. It is thus considered a new species and defined with the binomial Streptomyces avellaneus.

TABLE II.—COMPARISON OF SPECIES

| | Streptomyces F.I. 2758 | Streptomyces aureofaciens mutant, cp. 11834 ATCC | Streptomyces $c_2$. 3054 mutant of S. aureofaciens |
|---|---|---|---|
| Sporophores | Straight section RF | Straight section RF | Straight section RF. |
| Spores | Cylindrical, 1.2–1.5 x 1.4–1.7$\mu$ | Oval, 0.5–1.6 x 0.5–1.6$\mu$ | Oval or cylindrical, 1 x 1.5$\mu$. |
| Vegetative mycelium | From light yellow to light brown-chestnut color back side from straw-yellow to chestnut-brown. | From yellowish to orange-yellow back side from yellow to brown. | From white-rose to pink salmon back side chamois brown-olive. |
| Aerial mycelium | From white to light hazel brown | From white to gray | From white to yellow; cottony or powdery. |
| Soluble pigments | Absent | Sometimes present from yellow-lemon to dark-brown. | Absent. |
| Starch | + | + | + |
| Gelatine | − | − | + |
| Nitrates | − | − | + |
| Tyrosine | − | Data not reported | Data not reported. |
| Melanine | − | do | Do. |
| Hydrogen sulphide | − | − | Do. |
| Galactose | Data missing | + | Do. |
| Mannitol | − | − | Do. |
| Milk | − | − | ± |

| | Streptomyces sT.U. V. 8 mutant of S. aureofaciens | Streptomyces sT. 11652 ATCC | Streptomyces verticillatus sT. AB929 | Streptomyces sT. CDSD. 314 mutant of S. aureofaciens |
|---|---|---|---|---|
| Sporophores | Old cultures are black with little spots of a white mycelium. They consist of a certain number of unities in short chains measuring 0.5–4.5$\mu$. | Open spirals RA section | Biverticilly without spirals. BV section. | With terminal hooks. RA section. |
| Spores | | Cylindrical 0.99–1.32 x 0.66$\mu$ | Cylindrical 0.6–0.8 x 1.9–2.5.$\mu$ | Not described. |
| Vegetative mycelium | From colorless to yellow | Waxen, from yellow to orange or red or olive-brownish. | White with white back side | Do. |
| Aerial mycelium | From whitish to gray | From white to mouse gray until black-gray. | Olive green with white-gray tonalities. | White. |
| Soluble pigments | Sometimes from brown to green. | Dark brown or red or brown-black. | Absent | Absent. |
| Starch | Not described | + | + | Not described. |
| Gelatine | do | + | + | Do. |
| Nitrates | do | − | ∓ | Do. |
| Tyrosine | do | Not described | Not described | Do. |
| Melanine | do | do | do | Do. |
| Hydrogen sulphide | do | do | + | Do. |
| Galactose | do | do | Not described | Do. |
| Mannitol | do | do | do | Do. |
| Milk | do | − | + | Do. |

| | Streptomyces sT. 88 1st. Antibiot. Polonia | Streptomyces fuscofaciens sT. 12061 ATCC | Streptomyces psammoticus | Streptomyces sT. 13938 ATCC |
|---|---|---|---|---|
| Sporophores | Straight RF section | Not described | Straight RF section | Straight RF section. |
| Spores | Not described | do | Not described | Spherical or oval 1.4 x 1.4–2.1$\mu$. |
| Vegetative mycelium | do | From colorless to brown. Back side brownish with red tonalities. | From light yellow to light brown. | From colorless to yellow. Back side from yellow to black. |
| Aerial mycelium | Reddish or orange | Almost absent, whitish-gray. | From light brown to dark brown with greenish tonalities. | From whitish to brown-gray. |
| Soluble pigments | From brown-green to yellow-gold orange. | From gray to red brown or also to strong black. | From light brown to dark brown strong brown green. | Absent. |
| Starch | ± | + | − | + |
| Gelatine | − | − | ± | − |
| Nitrates | − | − | Not described | Not described. |
| Tyrosine | Not described | Not described | do | Do. |
| Melanine | do | do | − | Do. |
| Hydrogen sulphide | do | do | Not described | Do. |
| Galactose | do | do | do | + |
| Mannitol | do | do | do | + |
| Milk | + | − | do | + |

TABLE II.—Continued

| | Streptomyces persimilis | Streptomyces aureofaciens Mediolanum sT. 462840 | Streptomyces aureofaciens sT. A 377 ATCC 10762 | Streptomyces viridifaciens sT. BL567201 ATCC 11980 |
|---|---|---|---|---|
| Sporophores | Not described | Not described | Flexuous with tendency to form spirals, RA section. | Open spirals, RA section. |
| Spores | do | do | Smooth, from spheres to rounds. | Not described. |
| Vegetative mycelium | Light yellow to brown | From yellow-cream to yellow-orange until brown. | From yellowish to yellow-orange until purple-brown. | From light-brown to brown. |
| Aerial mycelium | From white-snow to light gray until dark gray. | From white yellow to white gray until blue. | From whitish to ash-gray until a strong gray. | Mouse-gray. |
| Soluble pigments | From light yellow to yellow-brown. | From yellow-fluorescent to yellow brown. | Sometime present; from light to brown-light. | Yellow-green. |
| Starch | + | Not described | − | Not described. |
| Gelatine | − | do | ± | Do. |
| Nitrates | Not described | do | Not described | Do. |
| Tyrosin | do | do | do | Do. |
| Melanine | do | do | − | Do. |
| Hydrogen sulphide | do | do | ± | Do. |
| Galactose | do | do | Not described | Do. |
| Mannitol | do | do | do | Do. |
| Milk | do | + | ± | Do. |

NOTE: += Positive reaction.  −= Negative reaction.

Streptomyces F.I. 2758 may be stored by lyophilization using milk as suspending medium.

In the process of the invention, a tetracycline-producing strain of Streptomyces avellaneus is cultivated under aerobic conditions in a nutritive medium containing an assimilable source or sources of carbon and nitrogen and mineral salts. The strain, preferably Streptomyces F.I. 2758, is generally developed in a previously sterilized liquid cultural medium under aerobic conditions at a temperature of from 22° C. to 35° C., preferably at 28° C., over a period of from 72 to 168 hours, preferably 120 hours, at a pH initially of from 6.0 to 7.0 and at the end of the fermentative process of from 6.5 to 7.2. In the cultural medium the carbon source may be starch, dextrin, glycerol, maltose, corn steep liquor, distillers solubles, soyabean oil, bacon-fat oil or others usually employed for the purpose. The nitrogen source, besides the above complex substances, may be meat extract, dry yeast, peptone ore cotton-seed meal, casein or casein hydrolysates and ammonium salts, such as: ammonium sulphates, di-ammonium hydrogen phosphates, ammonium nitrate or others usually employed for this purpose. The mineral salts vary according to the medium employed. In a medium containing complex substances, such as various meals and fermentation residues, additions of calcium carbonate and sodium or potassium phosphates have proved useful. In media containing dextrin and casein or ammonium salts, additions of mineral salts such as potassium, magnesium, iron, copper, zinc, manganese or cobalt salts, are necessary.

The fermentation may be carried out in Erlenmeyer flasks or in laboratory or industrial fermenters of various capacity. The tetracycline in the fermentation broths may be quantitatively determined by chemical or biological methods.

In order to extract the tetracycline from the broths, conventional methods, such as extractions with common solvents optionally in the presence of coadjuvants or adsorbents, may be employed. A method which allows very good extraction and purification consists essentially of an extraction with a mixture of tricresol and carbon tetrachloride at an alkaline pH. The preferred mixtures of tricresol (which consists of the three isomers of cresol and has a specific gravity 1.030–1.038) and carbon tetrachloride used for the extraction are those having a ratio tricresol/carbon tetrachloride of from 1:1 to 1:3.

The extraction may be performed as follows: To the culture broth containing the tetracycline, oxalic acid is added. The broth is then filtered and to the filtrate a chelating agent for polyvalent metallic ions such as sodium ethylenediamine tetraacetate is added. The filtrate is extracted with a mixture of tricresol and carbon tetrachloride at a pH adjusted to 8–8.5 by addition of a base. The organic phases are separated, preferably by centrifugation, and acetone and an aqueous solution of an inorganic or organic acid, preferably citric acid, are added thereto. The mixture is shaken and the phases are separated. The aqueous extract thus obtained contains the antibiotic together with a certain quantity of colored impurities and tricresol. It is purified by shaking with a solvent immiscible with water such as, for example, butanol or methylisobutylketone and analogues. To facilitate the separation of the two phases and the passage of the colored impurities into the organic phase, it has proved convenient, before carrying out the extraction, to add a certain quantity to a tensioactive substance such as an alkali metal alkylsulphonate or a quaternary ammonium salt, for example. Then the two phases are separated and the organic phase is discarded. The aqueous phase separated is taken up to pH 5–7 by addition of a base, for example an alkali metal hydroxide or carbonate. The antibiotic tetracycline precipitates and may be isolated as such or purified by recrystallization or transformed into a salt with an inorganic or organic acid.

The following examples serve to illustrate the invention without limiting it.

EXAMPLE 1

Two 300 cc. Erlenmeyer flasks containing each 60 cc. of the following vegetative medium, were prepared:

| | Percent |
|---|---|
| Corn steep liquor | 1.5 |
| Ammonium sulphate | 0.4 |
| Calcium carbonate | 0.6 |
| Soluble starch | 2 |
| Glucose | 0.5 |
| Maize meal | 0.1 |
| Monopotassium dihydrogen phosphate | 0.06 |

Tap water to 1000 cc.

Sterilization was performed by heating in an autoclave at 120° C. for 20 minutes. The pH after sterilization was 6.6. Each flask was inoculated with about one third of the mycelium surface of a 10 day old slanted culture of Streptomyces F.I. 2758 grown at 28° C. on the following solid medium:

| | Percent |
|---|---|
| Malt extract | 1 |
| Yeast extract | 0.4 |
| Glucose | 0.4 |
| Agar | 1.8 |

Distilled water to 1000 cc.
pH after sterilization 6.2

The flasks were incubated at 28° C. for 27 hours on a rotary shaker with a stroke of 3.5 cm. at 240 r.p.m. 3 cc. of a culture thus obtained were introduced to inoculate a 300 cc. Erlenmeyer flask containing 300 cc. of the following medium:

| | Percent |
|---|---|
| Starch | 6 |
| Calcium carbonate | 0.4 |
| Soya meal without grease | 3 |
| Casein | 1 |
| Magnesium sulphate | 0.05 |
| Molasses | 0.2 |
| Bacon-fat oil | 1 |

Tap water to 1000 cc.

The pH after sterilization at 120° C. for 20 minutes was 6.8. The culture was incubated at 28° C. on a rotary shaker with a stroke of 3.5 cm. at 220 r.p.m. as for the vegetative phase. After 120 hours of fermentation, a maximum activity corresponding to a concentration of 6000 μg./cc. of tetracycline was obtained.

EXAMPLE 2

Operation was as in Example 1 with the difference that for the vegetative phase the following medium was employed:

| | Percent |
|---|---|
| Corn steep liquor | 3.5 |
| Calcium carbonate | 1.8 |
| Saccharose | 0.5 |

Tap water to 1000 cc.
Sterilization 120° C. for 20 minutes.
pH after sterilization 6.5.

and that for the productive phase the following medium was employed:

| | Percent |
|---|---|
| Starch | 12 |
| Corn steep liquor | 2.6 |
| Calcium carbonate | 1 |
| Ammonium sulphate | 1 |
| Manganese sulphate | 14.5 |
| Cobalt chloride | 0.78 |
| Cotton-seed meal | 0.45 |
| Bacon-fat oil | 2.5 |

Tap water to 1000 cc.

The pH was brought up to 6.2 with sodium hydroxide and sterilization was performed at 120° C. for 20 minutes. After 120 hours of fermentation under the conditions in Example 1, an activity corresponding to a concentration of 10,500 μg./cc. of tetracycline was obtained.

EXAMPLE 3

Operation was as in Example 1 with the difference that the vegetative phase was carried out in the following medium:

| | Percent |
|---|---|
| Corn steep liquor | 1.5 |
| Ammonium sulphate | 0.4 |
| Calcium carbonate | 0.6 |
| Monopotassium dihydrogen phosphate | 0.03 |
| Starch | 2 |
| Glucose | 0.5 |
| Maize meal | 0.1 |
| Soya meal | 0.4 |
| Bacon-fat oil | 0.25 |

Tap water to 1000 cc.

The pH was brought to 6.6 by adding sodium hydroxide, and the productive phase was carried out on the following medium:

| | Percent |
|---|---|
| Starch | 6 |
| Glucose | 0.5 |
| Corn steep liquor | 2.5 |
| Soya meal | 0.5 |
| Maize meal | 1 |
| Ammonium sulphate | 0.6 |
| Ammonium chloride | 0.1 |
| Manganese sulphate | 0.01 |
| Cobalt chloride | 0.0005 |
| Bacon-fat oil | 3 |

After 120 hours of fermentation a maximum production of 7700 μg./cc. of tetracycline was obtained.

EXAMPLE 4

In a 10 liter glass fermenter, 6 liters of a vegetative medium as in Example 2 were sterilized by heating at 120° C. for 30 minutes. After cooling, the medium was inoculated with 200 cc. of a vegetative culture prepared in an Erlenmeyer flask as in Example 1. The mixture was incubated at 28° C. for 24 hours with an air stream corresponding to 6 liters per minute of air and agitating in a four paddle rotary shaker at 350 r.p.m. The vegetative medium thus obtained serves to inoculate, in a 5% ratio, 6 liters of a productive medium as in Example 2 contained in a 10 liter fermenter and sterilized at 120° C. for 30 minutes. The mixture was incubated at 28° C. with an air stream of 6 liters per minute and agitated in a 4 paddle rotary shaker at 450 r.p.m. After 5 days incubation, a production corresponding to 7500 μg./cc. of tetracycline was obtained.

EXAMPLE 5

To 7.330 kg. of a culture broth, prepared as in Example 4 and containing 55 g. of tetracycline as hydrochloride, 87 g. of oxalic acid were added. The mixture was stirred for 1 hour, 500 g. of infusorial earth were added, and the mixture was filtered. The filter cake was washed with 2.5 liters of an aqueous solution containing 1% of oxalic acid. 9.8 liters of filtrate were obtained to which 55 g. of ethylendiamine-sodium-tetraacetate and a mixture of 500 cc. of tricresol and 1000 cc. of carbon tetrachloride were added. The mixture was strongly stirred and 275 cc. of a 20% aqueous sodium hydroxide solution were added to bring the pH to 8. The phases were then separated by centrifuging, the organic phase was washed with a small amount of water, shaken with 5 g. of decolorizing carbon, and filtered on a paper filter with a layer of infusorial earth. To the filtrate, 500 cc. of acetone and 300 cc. of a 10% aqueous citric acid solution were added. The mixture was shaken, the phases were separated and the organic phase was extracted with two portions each of 200 cc. and 100 cc. of a 10% aqueous citric acid solution. The hydroacetonic extracts were collected together, 10 cc. of a 10% aqueous stearyl trimethylammonium sulphate solution were added, and the mixture shaken with 320 cc. of butanol. The butanol, which becomes yellow-brown colored, was separated and discarded.

The purified aqueous extract was shaken, and a 20% aqueous potassium hydroxide solution was added until the pH rose to 5.8. The mixture was cooled on an ice-bath and after 20 hours the precipitate obtained was filtered, washed with water and dried at 50° C. under vacuum. 35.21 g. of the product having a potency of 102.2 μg./mg., corresponding to 35.21 g. of tetracycline hydrochloride, were obtained. The mother liquors on being alkaline to pH 7 separated out a further quantity of antibiotic which, after drying at 50° C., under vacuum, gave 6.69 g. of tetracycline having a potency of 855 μg./mg. corresponding to 5.72 g. of tetracycline hydrochloride.

EXAMPLE 6

To 16 kg. of a culture broth containing 160 g. of tetracycline as hydrochloride, 200 g. of oxalic acid were added.

The mixture was shaken for 1 hour, 1 kg. of infusorial earth was added, and the mixture was filtered. The cake was washed with 5.5 liters of a 1% aqueous oxalic acid solution. To the filtrate thus obtained, 160 g. of ethylendiamine-sodium-tetraacetate were added, the pH was adjusted to 8.4, and extraction was performed with a mixture of 1.07 liters of carbon tetrachloride and 1.07 liters of tricresol. The organic phase was extracted with 1050 cc. of acetone and 750 cc. of a 10% aqueous citric acid solution. The mixture was shaken, the phases were separated and the organic phase was extracted with two portions of 400 and 350 cc. of a 10% aqueous citric acid solution. The collected hydroacetonic extracts were purified by shaking with 500 cc. of methylisobutylketone and 1 g. of sodium lauryl sulphonate. The extract in the organic solvent was discarded and the aqueous extract was treated with 5 g. of decolorizing carbon. To the filtered extract, a 20% aqueous potassium hydroxide solution was added to bring the pH to 5.5. After cooling the solution on ice for 30 hours, the precipitate was filtered off, washed with water and dried at 50° C. under vacuum. 98.7 g. of tetracycline having a potency of 106 µg./mg. corresponding to 104 g. of tetracycline hydrochloride were obtained.

From the mother liquors which contain 17 g. of tetracycline hydrochloride, by extraction with tricresol-carbontetrachloride and operating as above, 11.5 g. of the antibiotic having a potency of 951 µg./mg. corresponding to 10.93 g. of tetracycline hydrochloride were obtained.

EXAMPLE 7

To 11.25 kg. of a culture broth containing 113.6 g. of tetracycline as hydrochloride, 200 g. of oxalic acid were added. The mixture was shaken for 1 hour, 1 kg. of infusorial earth was added and then filtered. The cake was washed with 7 liters of a 1% aqueous oxalic acid solution. To the filtrate (14.18 liters) 100 g. of ethylendiamine-sodium-tetraacetate, 700 cc. of tricresol and 1400 cc. of carbon tetrachloride were added. The pH was taken up to 8.4 with a 20% aqueous sodium hydroxide solution and the mixture was shaken for 15 minutes. The two phases were separated by centrifuging and the aqueous phase was again extracted with 100 cc. of tricresol and with 300 cc. of carbon tetrachloride and discarded. The organic extracts were collected and filtered on a paper filter with a layer of infusorial earth. To the filtrate (1240 cc.), 300 cc. of acetone and 980 cc. of a 10% aqueous citric acid solution were added. The mixture was shaken and in order to dissolve a slight turbidity 150 cc. of a 20% aqueous sulphuric acid solution were added. The mixture was again shaken and the phases were separated. The organic phase was twice extracted again with 200 cc. of a 10% aqueous citric acid solution. To the collected hydroacetonic extracts, 600 cc. of n.butanol were added and shaken. A further 20% aqueous potassium hydroxide solution was added to bring the pH to 5.5. Stirring was maintained for 63 hours at room temperature. The precipitate was filtered and washed with n.butanol and then with water. The mixture was dried at 50° C. under vacuum and 90,600 g. of tetracycline having a potency of 991 µg./mg. equal to 89.78 (79% yield) were obtained.

We claim:

1. A fermentative process for the preparation of tetracycline which comprises cultivating a tetracycline-producing strain of *Streptomyces avellaneous* I.M.R.U. index number 3911 under aerobic conditions in a nutritive medium containing an assimilable source or sources of carbon and nitrogen and mineral salts, at a temperature from 22° to 35° C. over a period of from 72 to 168 hours at a pH of from 6.0 to 7.2 and recovering the tetracycline.

2. The process of claim 1, wherein the tetracycline prepared is transformed into a salt with a non-toxic pharmaceutically acceptable inorganic or organic acid.

References Cited

UNITED STATES PATENTS

| 3,398,057 | 8/1968 | Zannini et al. | 195—80 |
| 3,401,088 | 9/1968 | Villax | 195—80X |
| 3,434,930 | 3/1969 | Paleckova et al. | 195—80 |

OTHER REFERENCES

Derwent Farm Doc., Sept. 9, 1966, citing Netherlands Applic. 65,13122.

JOSEPH M. GOLIAN, Primary Examiner